Sept. 23, 1969  S. J. MARWIL  3,468,868
POLYMER RECOVERY PROCESS
Filed Aug. 6, 1964
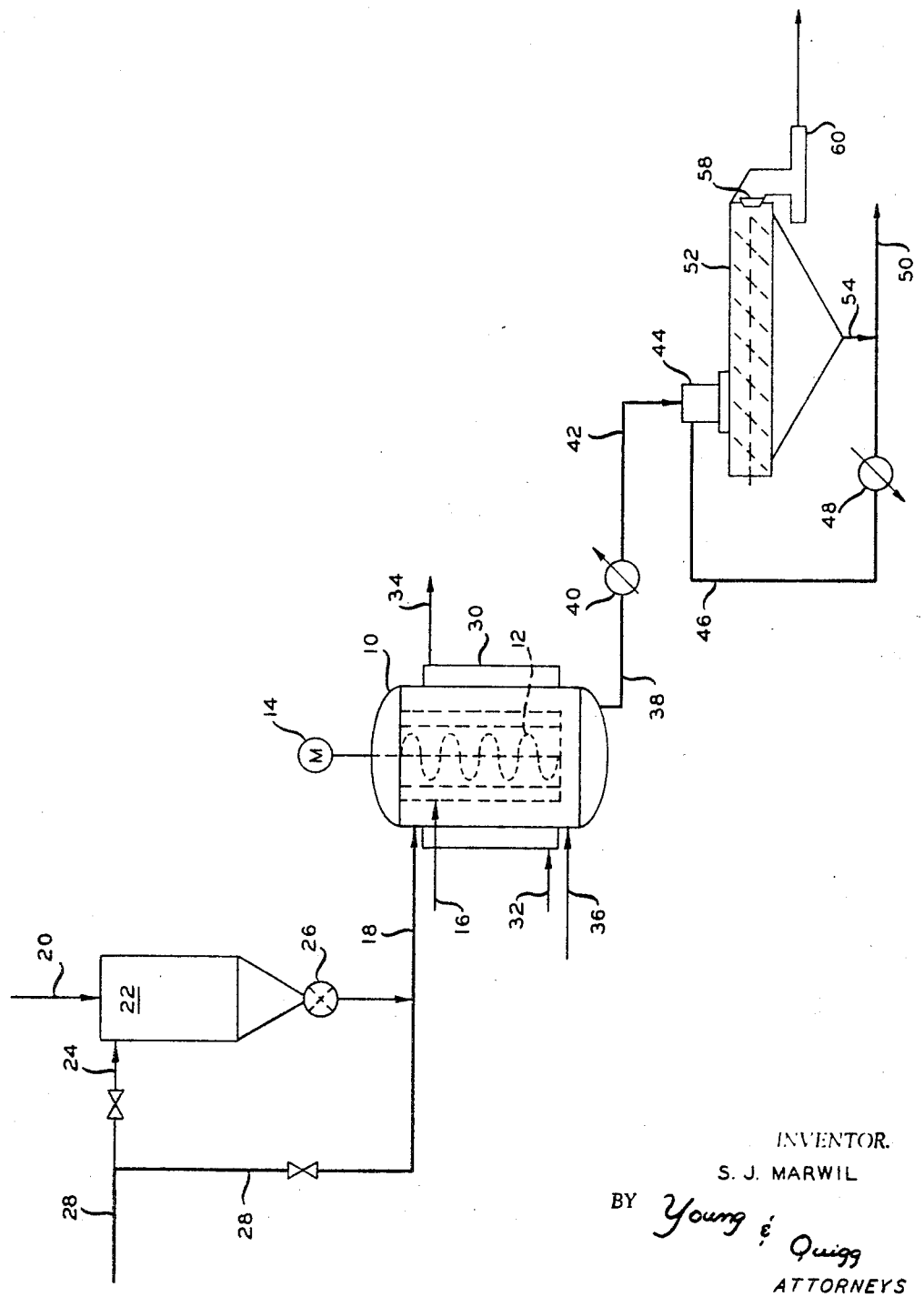
INVENTOR.
S. J. MARWIL
BY Young & Quigg
ATTORNEYS United States Patent Office 3,468,868
Patented Sept. 23, 1969

3,468,868
POLYMER RECOVERY PROCESS
Stanley J. Marwil, Bartlesville, Okla., assignor to Phillips Petroleum Company, a corporation of Delaware
Filed Aug. 6, 1964, Ser. No. 387,867
Int. Cl. C08f 1/88
U.S. Cl. 260—94.9         2 Claims

ABSTRACT OF THE DISCLOSURE

Recovery of solid polymer from a high concentration solution thereof is achieved by flashing the solution of solvent and polymer so as to form a continuous rope of polymer which is then passed directly to an expeller for removal of liquid solvent.

This invention relates to the recovery of normally solid polymers. In one aspect, it relates to the recovery of a normally solid polymer substantially solvent free from a solution thereof in a solvent.

Several different processes are known in the art for the production of normally solid polymers, such as polyethylene, polybutadiene and polystyrene. In many of the known processes, the polymer is initially obtained in the form of a solution in a solvent and must be recovered therefrom. Recovery can be effected by different methods such as solvent vaporization, which leaves the polymer as a non-volatile residue, and cooling of the solution to cause precipitation of the polymer, thereafter being subsequently separated by filtration. Vaporization processes for solvent removal in particular are characterized by the inherent difficulty in removing the last traces of solvent from the polymer. This difficulty arises from the fact that as the solution becomes more and more concentrated, its viscosity increases sharply even if molten. Heat and mass transfer are correspondingly retarded and, if proper process design and operation are not exercised, some of the polymer may be thermally decomposed as a result of unduly high residence times in recovery equipment at high localized temperatures. In addition, difficulty has been experienced in the subsequent handling of polymers obtained from solution in this manner due to the tendency of the polymer to form long strands or filaments which because of their low bulk denstiy tend to clog the system downstream of the solvent removal stage or to present other handling problems as when feeding same through a vacuum dryer-extruder. It is highly desirable to free the polymer from the solvent insofar as possible because small amounts e.g. a few weight percent, of solvent in the polymer form bubbles and, consequently, cavities when the polymer is heated preparatory to molding or film formation.

In accordance with the invention, however, it was surprisingly found that by utilization of a polymer-solvent stream wherein the concentration of the polymer was about 20 to 40 weight percent therein, there was achieved, as a result of flash removal of the solvent as described more fully below, a low bulk density strand or "rope" of polymer which could be readily introduced into a liquid expeller wherein additional liquid solvent is removed.

Accordingly, it is an object of the present invention to provide a process for the recovery of solid polymer from a solution thereof. A further object of the invention is to provide a process whereby a polymer composition containing less than 1 weight percent of solvent is continually recovered from the effluent of a high-solids polymerization reactor.

Other objects, advantages and features of the invention will be readily apparent to those skilled in the art from the following discussion, the drawings and the appended claims.

The drawing is a diagrammatic view of the inventive apparatus.

According to this invention, a viscous solution of a normally solid material obtained in a high-solids concentration is flashed to separate a substantial portion of the solvent therefrom in such a manner as to form one or several rope-like strands and liquefied solvent which can then be subsequently separated by liquid expelling to produce nearly solvent-free polymer without the necessity of reconverting the polymer to a molten state prior to the ultimate recovery of same. Further according to this invention, an apparatus is provided comprising an evaporation chamber and expelling means which are operably associated to recover nearly solvent-free polymer particles therefrom.

Thus as shown in the drawing, a high-solids reactor 10 is provided with scraper and/or auger means 12 operated by motor 14. Olefin feed is introduced into the reactor by way of line 16 and a suspension of finely divided chromium oxide catalyst in diluent (which may be the same as the polymerization solvent) is introduced through line 18. Activated catalyst from line 20 enters catalyst mud tank 22 along with make-up diluent from line 24 in sufficient volume to form a catalyst mud which is fed by feeder 26 into line 18 and mixed with diluent from line 28 to form a suitable dilute suspension of catalyst in diluent and to provide the required amount of make-up polymerization solvent to maintain a desired polymer concentration in the reactor. Reactor 10 is preferably jacketed as illustrated by jacket 30 through which coolant is circulated through lines 32 and 34. Recycle solvent is introduced to the reactor from line 36 and an effluent solution of polymer is withdrawn through line 38 and is heated in heat exchanger 40 and passed by means of conduit 42 to flash zone 44. Flashed solvent is removed by means of conduit 46 and passed to condenser 48 from which it is removed by line 50 and combined with the liquid effluent from expeller 52 by line 54 for subsequent treatment and recycle to the system.

The resulting polymer in flash zone 44 assumes a "rope-like" configuration which is then discharged into expeller 52. The remaining now-liquefied solvent is separated from the polymer rope by the expeller and drained therefrom through conduit 54 from where it is passed to a cleanup column or other steps not shown for conditioning of the liquid solvent for recycle to the reactor. The thus nearly solvent-free polymer is passed from the expeller through orifice 58 where it may be pelletized and from which it is picked up by air conveyor 60 and removed for subsequent handling such as for bagging or storage thereof.

The high-solids reactor may be of the type disclosed by W. C. Lanning in U.S. Patent 2,894,824, or other high-viscosity reactors such as available from Crawford and Russell, Engineers and Contractors, Stamford, Conn., which is essentially of the design illustrated and is exceptionally well adapted to the high-solids solution process of the present invention.

The invention is applicable to the polymerization of aliphatic 1-olefins having from 2 to 8 carbon atoms per molecule and no chain branching nearer the double bond than the 4-position. These olefins include those disclosed in the Hogan and Banks Patent 2,825,721, particularly ethylene, propylene, 1-butene, 1-pentene, 1-hexene, 1-heptene, 1-octene, 4-methyl-1-pentene, butadiene and isoprene. Homopolymers and copolymers may be made by this process. Substantially pure ethylene may be polymerized by this process or ethylene can be copolymerized with any one or more of the other monomers, particularly in high concentrations, to produce a copolymer or tripolymer consisting principally of ethylene polymer. Butene-1 is commonly utilized in minor concentration in the ethylene feed to produce a polyolefin which has exceptionally desirable properties.

The reactor effluent is generally maintained so that the concentration of polymer in the resulting solution is in the range of about 20 to 40 weight percent and the concentration of catalyst therein is so low that the concentration of the catalyst in the polymer product, without removal of catalyst, is not more than 0.02 weight percent, which meets commercial specifications. Thus in a system of the type described herein, the necessity for removal of catalyst residues is avoided. The catalyst used is a highly active powdered catalyst having a maximum particle size of 100 microns, 50 percent thereof below 10 microns in size, and consisting essentially of chromium oxide deposited on silica-alumina, at least a portion of the chromium being hexavalent at the initial contacting with the olefin. The alumina may be partially or totally substituted by zirconia and/or thoria. The chromium oxide in the catalyst is in the range of 0.1 to 10 weight percent and is ordinarily about 1.5 to 3 weight percent of the composite catalyst. In addition, diethylzinc, triethylaluminum or triethylboron may be used in admixture with the chromium oxide catalyst.

The solvents particularly desired in the process of this invention are inert hydrocarbon solvents such as cyclohexane, methylcyclopentane, and the like.

To illustrate the invention, reference is made to an ethylene polymerization process in a high-solids reactor as illustrated in the drawing. In this process ethylene is fed into the reactor 10 at the rate of about 76,749 pounds per day at a temperature of about 120° F. About 134,000 pounds per day of solvent total is also fed. Activated catalyst consisting essentially of chromium oxide (a portion hexavalent) deposited on silica-alumina (chromium oxide concentration about 2 weight percent) in finely divided form, 50 weight percent being less than 10 microns in size, is admixed with cyclohexane (as the solvent feed) and the resulting catalyst slurry is fed to the reactor at the rate of 14.4 pounds of catalyst in 6,000 pounds of cyclohexane per day. By means of circulating cooling water through the jacket of the reactor, the reactor temperature is maintained at about 260° F. and the reactor pressure is controlled at about 450 p.s.i.a.

The effluent solution of polymer (containing between 20 and 40 weight percent polymer, preferably about 35 weight percent) is introduced to the heat exchanger where it is raised to a temperature of 320° to 400° F., preferably about 360° F. The resulting heated effluent is then passed to an adiabatic flash zone 44 maintained at a pressure of 2 to 5 p.s.i.a. wherein a substantial portion of the solvent is vaporized, thus cooling and precipitating the polymer in essentially solvent-free strand or rope form (5 percent solvent) and cooling the remaining solvent as an accompanying liquid, the mixture of polymer rope and solvent liquid falling into the expeller 52 inlet where a liquid-from-solid expressing step is performed. The concentration of catalyst in the polymer is about 0.02 weight percent or less, which is within commercial specification. The dried polymer is recovered from the expeller 52 discharge 60 at a rate of about 72,360 pounds per day having a polymer content of about 72,000 pounds and a solvent content of 0.5 weight percent. About 3640 pounds per day of liquid solvent are expressed from the polymer and recovered as stream 54.

The resulting vapor stream 46 from flash zone 44 is passed by a compressor (not shown) at the rate of about 136,000 pounds per day of solvent and 4,749 pounds per day of ethylene through a condensing zone 48, and joining the solvent from line 54 produces a recycle stream consisting of about 139,640 pounds per day of solvent and 4,749 pounds per day of ethylene as line 50.

Reasonable variations and modifications of this invention can be made, or followed, in view of the foregoing disclosure, without departing from the spirit or the scope thereof.

I claim:

1. A process for recovering a solid polymer of an aliphatic-1-olefin containing from 2 to 8 carbon atoms from a solution of same in a solvent wherein said polymer is present in a concentration in the range of about 20 to 40 weight percent which comprises heating the solution of polymer and solvent to a temperature in the range of 320 to 400° F., flashing the resulting heated solution in a flash zone maintained at a pressure of 2 to 5 p.s.i.a. so as to form at least one continuous rope-like strand of said polymer containing not more than 5 weight percent solvent and thereafter continually feeding the resulting rope-like strand of polymer and liquid solvent to an expelling zone which is maintained at a temperature below the molten state temperature of said polymer and, wherein the polymer is maintained in a solid state, therein removing the liquid solvent from said polymer without melting the polymer and thereafter recovering the solid, substantially solvent-free polymer.

2. A process according to claim 1 wherein said olefin is ethylene and said solvent is cyclohexane.

References Cited

UNITED STATES PATENTS

| | | | |
|---|---|---|---|
| 2,944,047 | 7/1960 | Schutze et al. | 260—94.9 |
| 3,197,453 | 7/1965 | Harban | 260—94.9 |
| 3,203,943 | 8/1965 | Houser et al. | 260—94.9 |
| 2,964,513 | 12/1960 | Dale. | |
| 3,320,220 | 5/1967 | Di Drusco. | |

JAMES A. SEIDLECK, Primary Examiner

U.S. Cl. X.R.

260—88.2, 93.7, 94.3